Nov. 18, 1958 W. L. EFFINGER, JR 2,860,620
CATAPULT FOR MODEL AIRCRAFT
Filed Feb. 15, 1956 4 Sheets-Sheet 1
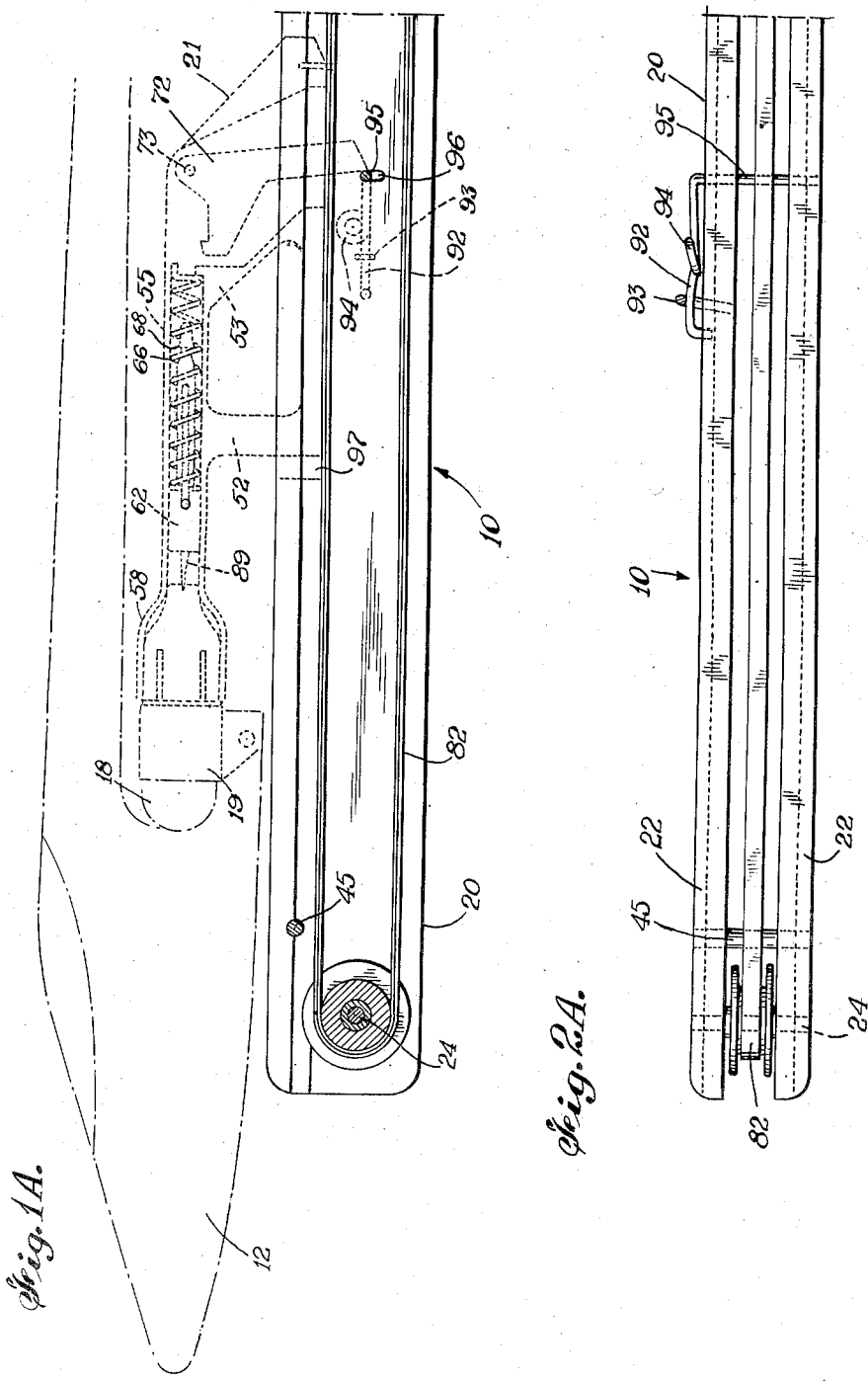

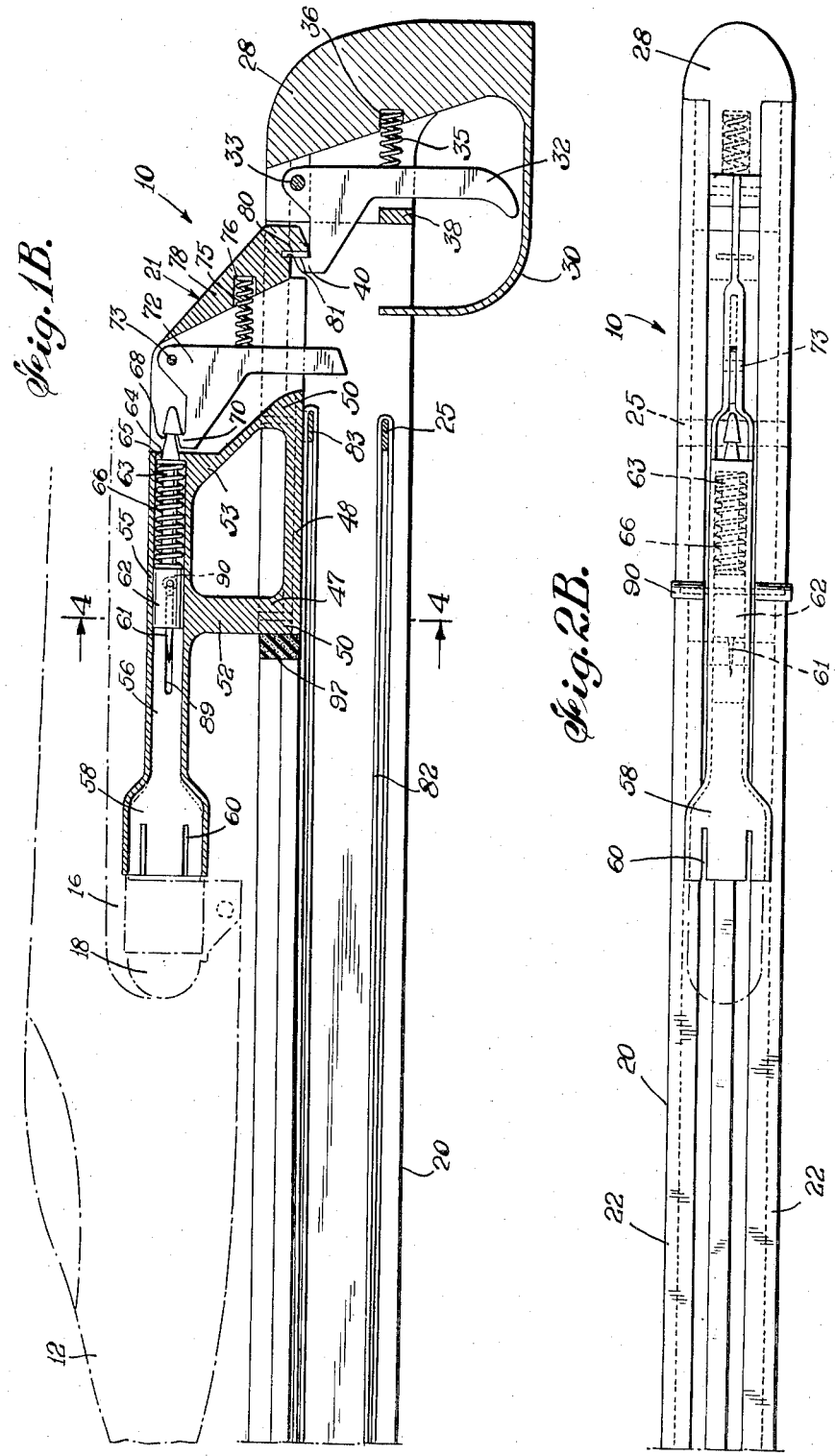

Nov. 18, 1958
W. L. EFFINGER, JR
2,860,620
CATAPULT FOR MODEL AIRCRAFT
Filed Feb. 15, 1956
4 Sheets-Sheet 3
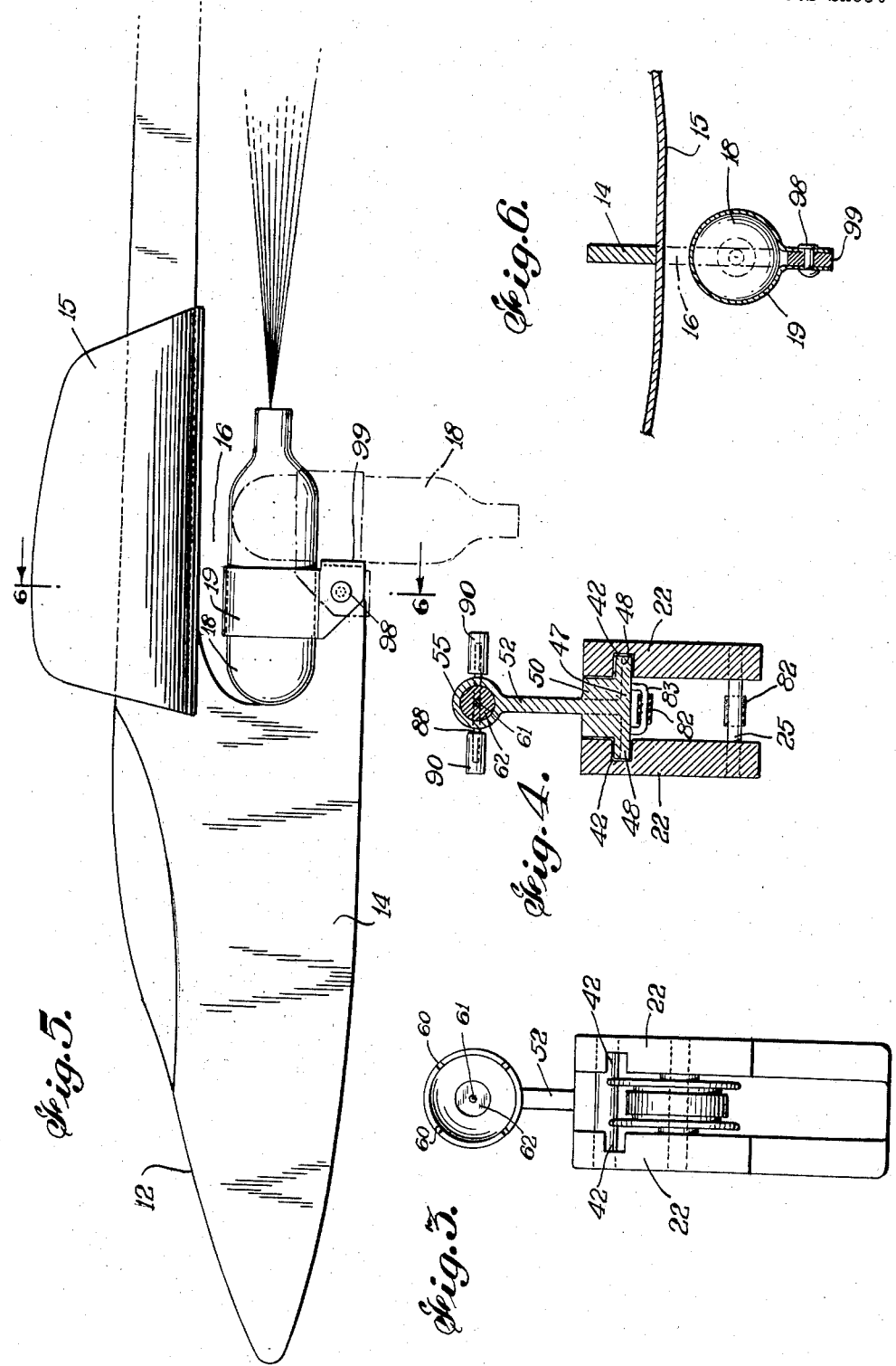

Nov. 18, 1958
W. L. EFFINGER, JR
2,860,620
CATAPULT FOR MODEL AIRCRAFT
Filed Feb. 15, 1956
4 Sheets-Sheet 4
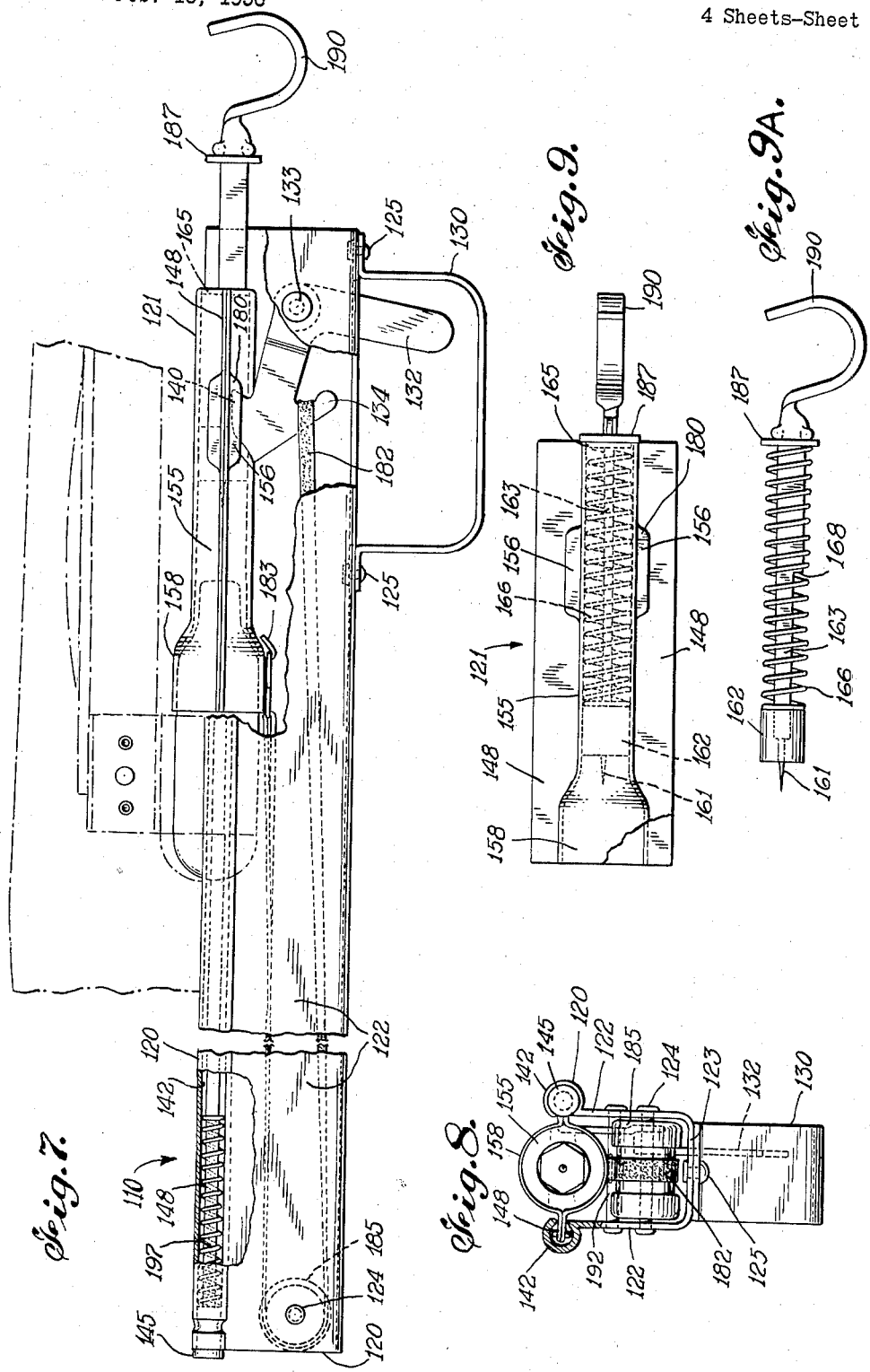

United States Patent Office 2,860,620
Patented Nov. 18, 1958

2,860,620

CATAPULT FOR MODEL AIRCRAFT

William L. Effinger, Jr., Glen Cove, N. Y.

Application February 15, 1956, Serial No. 565,608

11 Claims. (Cl. 124—21)

This invention relates to jet-propelled model aircraft and is more particularly concerned with a launching device by means of which the model aircraft may be launched from a standing start with high velocity.

The advent of jet propulsion for aircraft has naturally created a demand for toy model aircraft which employ the jet principle of propulsion. Various types of aircraft of this nature have been proposed but difficulty arises in providing a safe and effective means for launching them. It will be understood that the term "aircraft" as used herein includes all types of devices intended for flight through the air such as airplanes, rockets, missiles and the like. It is desirable that such craft be constructed so that they can be played with by children of all ages and that they be entirely safe for use by small children. It is also desirable that the launching means be such that the aircraft will be given a substantial driving force so that it will have a reasonably long flight. Prior proposals in this field have not generally met these criteria.

It is an object of the invention to provide a launching device of this nature which is entirely safe for use by children.

It is another object of the invention to provide a model aircraft launching device which permits the aircraft to be given a high thrust as it is launched.

It is another object of the invention to provide a toy suitable for use by children of all ages.

In accordance with the invention, there is provided a toy which includes a model aircraft and a launching device which cooperates with the aircraft to propel it into the air and simultaneously to activate jet propelling means which serve to drive the aircraft forwardly. The aircraft is adapted to receive a jet propelling cartridge, e. g. a compressed gas cartridge, as the jet propelling means and comprises a holder for the cartridge. The launching device comprises an elastically-urged launching carriage which receives and acts upon an end of the jet propulsion cartridge, a track upon which the carriage is adapted to run for a predetermined distance during the moment of launching, a carriage holding means for retaining the carriage in cocked position prior to launching, a trigger for releasing the holding means to subject the carriage to the elastic means acting upon it, means for activating the cartridge by piercing it to permit escape of the jet propulsion material, e. g. compressed gas, a holder for the activating means, a tripper adapted to act on the holder to release the activating means at a predetermined point in the launching run of the carriage, and a stop for the carriage at the end of the launching run.

It is a feature of the invention that the launching device can readily be held in one hand.

It is another feature of the invention that the plane may be launched merely by acting upon the trigger of the launching device with one finger.

It is a further feature of the invention that the launching carriage is constructed to expose the aircraft to a high degree of thrust at the moment of take-off.

It is still a further feature of one embodiment of the invention that the aircraft carries the jet-propelled cartridge only as long as it is providing a driving thrust and then automatically jettisons the cartridge.

Other objects and features of the invention will be readily apparent from the following detailed description and from the accompanying drawings of illustrative embodiments of the toy of the invention. In the drawings, Figs. 1A and 1B show a side elevational view, partly in section, of a model aircraft launching device embodying features of the present invention, the associated airplane being indicated in phantom to show the relative relationship of parts;

Figs. 2A and 2B show plan views of the launching device illustrated in Figs. 1A and 1B;

Fig. 3 is a front elevational view of the launching device of the previous figures of the drawing, showing the device as it would appear when viewed from the left-hand end of Figs. 1A and 2A;

Fig. 4 is a vertical sectional view taken approximately along the line 4—4 of Fig. 1B;

Fig. 5 is a side elevational view of the plane showing the cartridge holding and jettisoning means of the invention;

Fig. 6 is a vertical sectional view taken approximately along the line 6—6 of Fig. 5;

Fig. 7 is a side elevational view partly broken away and partly in section to show details of construction of another embodiment of the model plane launching device of the invention;

Fig. 8 is an end elevational view, partly in section, of the device shown in Fig. 7 as it is seen when viewed from the left-hand side of Fig. 7;

Fig. 9 is a plan view of the carriage of the launching device shown in Figs. 7 and 8; and Fig. 9a is a side elevational view of the cocking mechanism and the cartridge piercing mechanism of the carriage shown in Fig. 9.

Referring to the drawings, and more particularly to Figs. 1 to 6, wherein the aircraft shown is an airplane, the launching device illustrated is indicated generally by the reference numeral 10, and a form of model plane with which the device 10 is adapted to be used as shown at 12. As seen in Fig. 5, plane 12 has a fuselage 14 formed from a flat strip of wood, plastic or other convenient material and a wing 15 of similar material which is mounted in a suitable slot in the fuselage 14. Below the wing 15, fuselage 14 is formed with a recess 16 adapted to hold the jet-propulsion cartridge 18 by means of a holding bracket 19 which will be described in more detail below. The cartridge 18 contains compressed gas, such as carbon dioxide, and is a known article of manufacture which forms no part of the present invention. The cartridge 18 has a tapered end having a discharge opening which is normally closed by a diaphragm or membrane which is adapted to be punctured by a pin or other pointed object.

The launching device or "gun" 10 comprises a main body portion or "barrel" 20 which is adapted to receive and guide the carriage 21. The body portion 20 is formed from two elongated strips 22 which are interconnected by pins 24 and 25, which are received in suitable aligned apertures formed in the strips, and the strips 22 merge at the rear of the body portion 20 into a handle or "stock" 28 which is formed with a trigger recess defined by the guard 30. A trigger 32 is pivotally mounted in the handle 28 by means of a pivot pin 33 which is received in the strips 22. The trigger 32 is normally urged away from the handle by a compression spring 35 which is connected to the trigger and is seated in a recess 36 formed in the handle. A stop 38 extending between strips 22 limits forward movement of the trigger. The forward upper end of the trigger is formed with a detent 40 for engaging the carriage 21, as will be described below. To provide a track for the carriage 21, the opposed inner surfaces of the strips 22 are formed with parallel grooves 42. A stop 45 extends between strips 22 near their forward ends and limits forward movement of the carriage.

The carriage 21, which may be formed from wood, metal, molded plastic, molded nylon, or the like, has a base portion 47 formed with wings 48 which engage in grooves 42 of the "barrel," as seen in Fig. 4. The wings 48 have upwardly-extending webs 50 which aid in guiding the carriage between the strips 22 and in keeping it centered. Connected to the base portion of the carriage are legs 52 and 53 which support the body or barrel 55 of the carriage. As seen in Figs. 1B and 4, the body 55 is cylindrical in form with a central bore 56, the forward portion of the body being enlarged to form a bell-like mouth 58 which is provided with longitudinal slots 60 extending inwardly from its free edge. As seen in Fig. 1B, the mouth 58 is shaped to receive the tapered end of the cartridge 18. Slidably mounted in the bore 56 is a cartridge firing mechanism which includes a sharply-pointed puncturing pin 61 carried in a piston 62. A stem 63 extends rearwardly from piston 62 and has an end which is adapted to pass through an aperture 64 in the rear wall 65 of the body 55. Mounted on the stem 63 between rear wall 65 and piston 62 is a coil compression spring 66 which normally urges the piston 62 and the puncturing pin 61 in the direction of the mouth 58. The outer end of the stem 63 is formed with a doubly conical surface which provides a circular shoulder 68 which is intended to be engaged by a detent 70 on the end of a lever arm 72 pivotally mounted in carriage 21 on the pivot 73 to hold the cartridge-firing mechanism in "cocked" position. The lever arm 72 is normally urged forwardly into engagement with the stem 63 by means of a compression spring 75 received in a seat 76 in the rear portion 78 of the carriage. Rear portion 78 is formed at its lower end with a shoulder 80 which is adapted to be engaged by the detent of the trigger 32 to hold the carriage in "cocked" position. To prevent wear of shoulder 80 when the carriage is not formed of metal, it is overlaid by a wear-resistant plate 81. The carriage is normally urged forwardly by any convenient elastic means. In the embodiment illustrated, the elastic means is in the form of a rubber band 82 having one end passed around fixed pin 25 and its other end connected to a hook member 83 carried by the base 47 of the carriage. The rubber band 82 passes around a pulley 85 rotatably mounted at the forward end of strips 22 on the pin 24. To cock the carriage against the action of band 82, it is merely necessary to pull back the carriage until the detent of trigger 32 engages the shoulder 80 of the carriage. To cock the cartridge-firing mechanism of the carriage, the piston 62, with its associated stem 63, is pulled back until the detent of the lever arm 72 engages the shoulder 68 of the stem. For this purpose, the piston is traversed by a pin 88 having ends which pass through longitudinal slots 89 formed in the wall of body 55 and which are covered by knobs or caps 90 intended to be engaged by the user's fingers to draw the piston rearwardly.

The plane is mounted on the launching device merely by inserting the tapered end of the cartridge in the mouth 58 of the carriage body 55, the slots 60 giving the mouth a slight spring gripping action on the cartridge. The other end of the cartridge is held in the bracket 19. Launching of the plane takes place in accordance with the invention by the combined action of the force of the elastic means 82 and the reaction created by the escape of gas from the cartridge. Release of the gas is effected by freeing the pin-carrying piston 62 to the action of spring 66 by tripping the lever arm 72. This is effected by tripper 92 shown in Figs. 1A and 2A. Tripper 92 in the embodiment illustrated is a spring wire secured to one of the strips 22 by a staple 93, with a spring loop 94 and an end arm 95 extending transversely of strips 22 by engagement in aligned slots 96 formed in each of the strips. The slots 96 are vertically elongated so that the arm 95 may undergo limited vertical movements. The arm 95 is normally held at the top of the slots 96 by reason of its spring mounting and it is positioned to be engaged by the end of the lever arm 72 as the carriage moves forwardly along the strips 22 of the barrel of the launching device.

Thus, to launch the plane after it has been positioned on the launcher 10, it is merely necessary to squeeze the trigger 32. This releases the plane-carrying carriage and allows it to move forwardly rapidly under the action of the elastic means 82, the carriage being guided in the track provided by the grooved strips 22. As the carriage reaches the point shown in phantom in Fig. 1A, the lever arm 72 is tripped by the spring arm 95 and the puncturing pin 61 moves forwardly and perforates the sealing diaphragm of the cartridge 18, allowing the compressed gas to escape. While the carriage continues its forward movement toward stop 45, the reaction set up by the escaping gas projects the cartridge and its associated plane forwardly away from the carriage. Since the end of the cartridge is confined in the belled mouth 58, a particularly effective reaction is created and the plane is forcefully projected into the air. The carriage, of course, stops when stop 45 is engaged and, to take up some of the shock, the forward wall of the carriage is provided with a shock-absorber in the form of a rubber pad 97.

As the plane leaves the carriage and starts its free flight, it carries with it the cartridge which continues to discharge its compressed gas and has a jet propelling effect. The cartridge is suitably mounted in such manner that it will be jettisoned when it has become discharged. For this purpose, the bracket 19 is pivotally mounted on a pivot pin 98 which is mounted in the body of the plane, as shown in Fig. 6, the pin 98 being forwardly of the center of gravity of the empty cartridge as shown in Fig. 5. As the cartridge is emptied, therefore, it pivots rearwardly into a vertical position and falls from the bracket under the influence of gravity. To prevent the cartridge from pivoting beyond the vertical position, the plane body portion which supports the bracket 19 is extended to provide an abutment surface 99 which stops the cartridge in the desired position, shown in phantom in Fig. 5. The cartridge is then free to fall away from the plane.

It will be apparent that various changes and modifications may be made in the specific embodiment above-described and illustrated in Figs. 1 to 6 without departing from the spirit and scope of the invention as defined in the appended claims. For example, the "barrel" of the launching gun may be formed from an integral body instead of from interconnected strips, the cartridge-jettisoning arrangement may be omitted, and the carriage may be modified with respect to its cocking arrangement, its cartridge piercing elements and the like. An embodiment of the invention which shows illustrative modifications of this nature is shown by way of example in Figs. 7 to 9a.

Thus, referring to Figs. 7 to 9a, wherein parts corresponding to those shown in Figs. 1 to 6 have been given like reference numerals to which 100 has been added, the launching device 110 comprises a main body portion, or barrel 120 which is formed from a single sheet metal strip or the like which has been suitably shaped to define side walls 122, a bottom 123, and carriage-receiving guide recesses 142. At the rear of the body portion 120, there is provided a guard 130 secured to the bottom 123 by any convenient means such as rivets 125. A trigger 132 is pivotally mounted at the rear of body portion 120 by means of a pivot pin 133 which extends between side walls 122, a suitable slot being formed in bottom 123 to permit passage of the trigger arm. The carriage 121 has a tubular body 155 and lateral wings 148 approximately at its axis, the wings being dimensioned to engage in the recesses 142 of the track, as will be seen in Fig. 8. As shown in Figs. 8 and 9, the body 155 is cylindrical in form with its forward portion being enlarged to form a bell-like mouth 158 for receiving the cartridge. As shown in Fig. 9, the sides of the body 155 are formed with swells 156 which are open at their lower sides to define shoulders 180, and the trigger 132 is laterally offset so that it will engage one of the shoulders 180 with its detent end 140 to hold the carriage until released when the launching of the plane is effected by squeezing the trigger, as shown in Fig. 7. Slidably mounted in body 155 is a cartridge firing mechanism which includes a sharply-pointed puncturing pin 161 carried in a rod 163. The forward end of the rod is formed with a cylindrical guide member 162 which also provides an abutment shoulder for holding one end of the coil spring 166. The rod 163 passes through an aperture in the rear wall 165 of the body 155 and the opposite end of spring 166 bears against this wall. The outer end of rod 163 has a looped finger grip portion 190 and a limit member 187 which is held against rearward axial movement by swage spurs or the like. As seen in Fig. 9a, the rod 163 is formed with a shoulder portion 168 which engages the edge of the aperture in rear wall 165 when the rod is pulled back into "set" position, as shown in Fig. 7. At the same time the trigger detent end 140 engages with the shoulder 180.

The carriage is normally urged forwardly by the elastic element 182 which, in the form illustrated, is a continuous rubber band having one end engaged around the projection 134 on the trigger 132 and its other end secured to the hook 183 secured to the underside of the carriage. At the forward end of the barrel 120, the band 182 passes around the rotatably mounted pulley 185 carried by the pin 124.

To "cock" the carriage on the barrel it is merely necessary to pull back on the finger grip portion 190 until the shoulder portion 168 comes into engagement with the wall 165 at the opening through which the rod 163 passes and the detent 140 of the trigger engages in the swell of the body 155.

Launching of the plane from the launching device shown in Figs. 7 to 9a is effected, as in the previously-described embodiment, by the combined action of the force of the elastic member and the reaction created by the escape of gas from the cartridge. The gas is released when the pin-carrying rod 163 is subjected to the action of spring 166 upon tripping of the finger grip portion 190 to unseat shoulder 168 from engagement with wall 165. This tripping action is effected by a tripper 192 which is a transverse rod extending between side walls 122 about one-third of the distance between the forward end and the rear end of the barrel, i. e. in the same relative position occupied by the tripper 92 shown in Figs. 1A and 2A.

The plane is mounted on the carriage as previously described and to launch the plane it is necessary only to squeeze the trigger. This disengages the trigger detent 140 and allows the carriage to move forwardly under the action of the elastic band 182. As the plane reaches the forward end of the barrel, the finger grip loop 190 strikes tripper 192 and the puncturing pin 161 moves rapidly toward the cartridge and punctures it, releasing the gas. The plane is thus forcefully projected into the air. As seen in Fig. 7, the forward ends of recesses 142 are closed by plugs 145 and are provided with buffer springs 197. These serve to stop the carriage at the end of its run.

It will be apparent that various other changes and modifications may be made within the scope of the claimed invention. It will further be understood that, insofar as they are not mutually incompatible, the various features and details of construction of the several embodiments described and shown in the accompanying drawings are interchangeable with one another. It is intended, therefore, that all matter contained in the foregoing decription and in the drawings shall be interpreted as illustrative only and not as limitative of the invention.

What I claim and desire to secure by Letters Patent is:

1. In a catapult for launching a model aircraft having mounted thereon a jet propulsion cartridge, in combination, means defining a track, a carriage movable along said track from a first end to a second end of said track, elastic propelling means for moving said carriage forwardly away from said first end along said track, latch means for releasably retaining said carriage at the first end of said track against force exerted on said carriage by said propelling means, means on said carriage for releasably holding said cartridge and thereby releasably holding said aircraft on said carriage, and means for activating said cartridge after said carriage has moved along said track under the influence of said elastic propelling means from said first end to a point in the vicinity of said second end.

2. In a catapult for launching a model aircraft having mounted thereon a jet propulsion cartridge, in combination, means defining a track, a carriage movable along said track from a first end to a second end of said track, elastic propelling means for moving said carriage along said track forwardly away from said first end, latch means for releasably retaining said carriage at the first end of said track against force exerted on said carriage by said propelling means, means on said carriage for releasably holding said cartridge and thereby releasably holding said aircraft on said carriage, means on said carriage for activating said cartridge, and means on the forward portion of said track to trip said activating means when the carriage approaches the forward end of its travel, said cartridge being thereby activated as the aircraft leaves said carriage.

3. In a catapult for launching a model aircraft having mounted thereon a jet propulsion cartridge, in combination, means defining a track, a carriage movable along said track, elastic propelling means for moving said carriage forwardly away from said first end along said track, latch means for releasably retaining said carriage at the first end of said track against force exerted on said carriage by said propelling means, means on said carriage including a cylindrical body having a belled mouth for releasably holding said cartridge and thereby releasably holding said aircraft on said carriage, means in said cylindrical body for activating said cartridge, and means on the forward portion of said track to trip said activating means when the carriage approaches the forward end of its travel, said cartridge being thereby activated as the aircraft leaves said carriage.

4. In a catapult for launching a model aircraft having mounted thereon a jet propulsion cartridge, in combination, means defining a track, handle means at a first end of said track for supporting said track, a carriage movable along said track from said first end to a second end of said track, elastic propelling means for moving said carriage forwardly away from said handle means along said track, latch means for releasably retaining said carriage at the first end of said track against force exerted on said carriage by said propelling means, means on said carriage for releasably holding said cartridge and thereby releasably holding said aircraft on said carriage, means on said carriage for activating said cartridge, lever means releasably holding said activating means, and means on the forward portion of said track to trip said lever means for releasing said activating means when the carriage approaches the forward end of its travel, said cartridge being thereby activated as the aircraft leaves said carriage.

5. In a catapult for launching a model aircraft having mounted thereon a jet propulsion cartridge, in combination, means defining a track, handle means at a first end of said track for supporting said track, a carriage movable along said track from said first end to a second end of said track, elastic propelling means for moving said carriage forwardly away from said handle means along said track, latch means for releasably retaining said carriage at the first end of said track against force exerted on said carriage by said propelling means, means on said carriage including a cylindrical body having a belled mouth for releasably holding said cartridge and thereby releasably holding said aircraft on said carriage, means on said carriage for activating said cartridge, lever means releasably holding said activating means and means on the forward portion of said track to trip said lever means for releasing said activating means when the carriage approaches the foward end of its travel, said cartridge being thereby activated as the aircraft leaves said carriage.

6. In a catapult for launching a model aircraft having mounted thereon a jet propulsion cartridge, in combination, a pair of interconnected parallel strips having spaced-apart inner faces formed with grooves to define a track, handle means for supporting said track-forming strips, a carriage movable along said track and having wing portions engaging in said grooves, elastic propelling means for moving said carriage forwardly away from said handle means along said track, latch means for releasably retaining said carriage at the rear end of said track against force exerted on said carriage by said propelling means, means on said carriage for releasably holding said cartridge and thereby releasably holding said aircraft on said carriage, and means for activating said cartridge after said carriage has moved along said track under the influence of said elastic propelling means from said first end to a point in the vicinity of said second end.

7. In a catapult for launching a model aircraft having mounted thereon a jet propulsion cartridge, in combination, an integral strip shaped to define a track, said track including laterally spaced apart recesses, a carriage movable along said track and having wing portions engageable in said recesses, elastic propelling means for moving said carriage forwardly from a first end to a second end of said track, latch means for releasably holding said carriage at the first end of said track against force exerted on said carriage by said propelling means, means on said carriage for releasably holding said cartridge and thereby releasably holding said aircraft on said carriage, and means for activating said cartridge after said carriage has moved along said track under the influence of said elastic propelling means from said first end to a point in the vicinity of said second end.

8. A toy comprising a model aircraft adapted to have mounted thereon a compressed-gas cartridge, and a catapult for launching said aircraft, said aircraft having a bracket for receiving said compressed-gas cartridge and said catapult having a slidably-mounted carriage provided with means for releasably holding said cartridge while it is contained in said bracket and thereby releasably holding said aircraft, said last-named means including means for puncturing said cartridge while it is still held in said carriage, said catapult having a first end and a second end and including elastic propelling means for moving said carriage forwardly away from said first end toward said second end, and means for actuating said puncturing means after said carriage has moved under the influence of said elastic propelling means from said first end to a point in the vicinity of said second end.

9. A toy comprising a model aircraft adapted to have mounted thereon a compressed-gas cartridge, and a catapult for launching said aircraft, said aircraft having a bracket for receiving said compressed-gas cartridge and said catapult having a slidably-mounted carriage provided with means for releasably holding said cartridge while it is contained in said bracket, means pivotally mounting said bracket on said aircraft on an axis which is horizontal when the aircraft is in horizontal flight, said pivoting means being positioned forwardly of the center of gravity of the compressed gas cartridge when said cartridge is seated in said bracket and said aircraft leaving the cartridge and the bracket free from obstruction rearwardly of said mounting means, whereby said cartridge will pivot from the horizontal position in which it is retained by said holding means into a vertical position under the weight of said cartridge, and said cartridge being free to fall from said bracket when in said vertical position.

10. A toy comprising a model aircraft adapted to have mounted thereon a compressed-gas cartridge and a catapult for launching said aircraft, said aircraft having a bracket for receiving said compressed-gas cartridge and said catapult having a slidably-mounted carriage provided with means for releasably holding said cartridge while it is contained in said bracket, said bracket being pivotally mounted on an axis which is horizontal when the aircraft is in horizontal flight for automatically pivoting said cartridge from a horizontal position in which it is retained by said holding means into a vertical position under the weight of said cartridge, said cartridge being free to fall from said bracket when in said vertical position, said catapult further comprising a track, said carriage being slidably-mounted in said track, elastic propelling means for moving said carriage in a forward direction along said track, latch means for releasably retaining said carriage at the rear end of said track against force exerted on said carriage by said propelling means, means on said carriage for activating said cartridge and means on the forward portion of said track to trip said activating means when the carriage approaches the forward end of its travel, said cartridge being thereby activated as the aircraft leaves said carriage.

11. A toy as defined in claim 10, wherein said aircraft is an airplane having a fuselage formed from a flat strip cut-out to receive said cartridge, the fuselage having an extension for pivotally supporting said bracket and providing a stop surface for limiting the pivoting movement of the cartridge in the bracket to the vertical position.

References Cited in the file of this patent

UNITED STATES PATENTS

| | | |
|---|---|---|
| 303,580 | Miller | Aug. 12, 1884 |
| 527,916 | Wiebach et al. | Oct. 23, 1894 |
| 2,264,399 | Oppenheim et al. | Dec. 2, 1941 |
| 2,611,355 | Ashwood | Sept. 23, 1952 |

OTHER REFERENCES

Popular Science Monthly for July, 1945, page 152.